March 14, 1933. P. C. GORDON 1,901,843
COUPLING DEVICE
Filed Aug. 29, 1927 2 Sheets-Sheet 1

Inventor
PHILIP C. GORDON
By his Attorney
Edmund G. Borden

March 14, 1933. P. C. GORDON 1,901,843
COUPLING DEVICE
Filed Aug. 29, 1927 2 Sheets-Sheet 2

Inventor
PHILIP C. GORDON
By his Attorney
Edmund G. Borden

Patented Mar. 14, 1933

1,901,843

UNITED STATES PATENT OFFICE

PHILIP C. GORDON, OF NEW YORK, N. Y., ASSIGNOR TO DOHERTY RESEARCH COMPANY, OF NEW YORK, N. Y., A CORPORATION OF DELAWARE

COUPLING DEVICE

Application filed August 29, 1927. Serial No. 216,128.

The present invention relates to couplings, and more particularly to devices adapted to transmit power between a driving gear and the driver of a locomotive, or part connected thereto.

It is well known to be desirable in railroad rolling stock to limit the unsprung weight as much as possible. This consideration requires that the weight of the driving motor be carried on the frame of the spring supported cab or like structure. However, the fact that the cab frame is spring supported introduces relative movement between this frame and the drivers. The relative motion between the cab frame and the drivers has necessitated the use of special couplings or driving mechanisms between the motor or motors and driver or drivers. Since it is desirable to use high speed electric or other motors, a reduction gearing is usually interposed between the motor shaft and the driver. Moreover, it has commonly been convenient to introduce the mechanical coupling or driving mechanism intermediate the gear wheel of the reduction gearing and the locomotive driver. It has been found, however, that the coupling mechanisms commonly used heretofore, and especially those adapted for arrangements in which the gear wheel of the reduction gearing is close to the locomotive driver, are mechanically incorrect, in that a relative lateral movement changing the perpendicular distance or degree of eccentricity between the axis of the motor or gear wheel and that of the driver produces a rotative torque between the driver and the other members and if the relative movement of the two axes is both large and sudden, due to an unusual deflection of the springs or due to the breaking of one or more springs, large stresses are produced in the coupling which may cause breakage of the parts. Relative movements of the cab and driver due to spring action and which are not sufficient to cause immediate damage nevertheless introduce proportional torsional stresses between the driving and driven members and lead to rapid wear, thereby severely limiting the mechanical design of electric and other locomotives.

It is the principal object of the present invention to produce a coupling mechanism adapted for use between a gear, or gears, and the driver, or drivers, of an electric locomotive, or between other driving and driven members apt to be subjected to changes in eccentricity when in use, and which shall be free from the difficulties above discussed.

The novel features of the present invention are pointed out with particularity in the appended claims. The invention itself, however, together with further objects and advantages, will best be understood from the following description taken in connection with the accompanying drawings, in which:

In Fig. 1 parts of the frame are omitted and parts of the gear wheel broken away for purposes of illustration;

Figs. 3 to 6 inclusive are diagrammatic views illustrating the action of the coupling according to the present invention in accommodating itself to a relative lateral movement between the axes of the driving and driven members connected by the coupling and causing a change in the eccentricity between said axes.

Figures 1, 2:
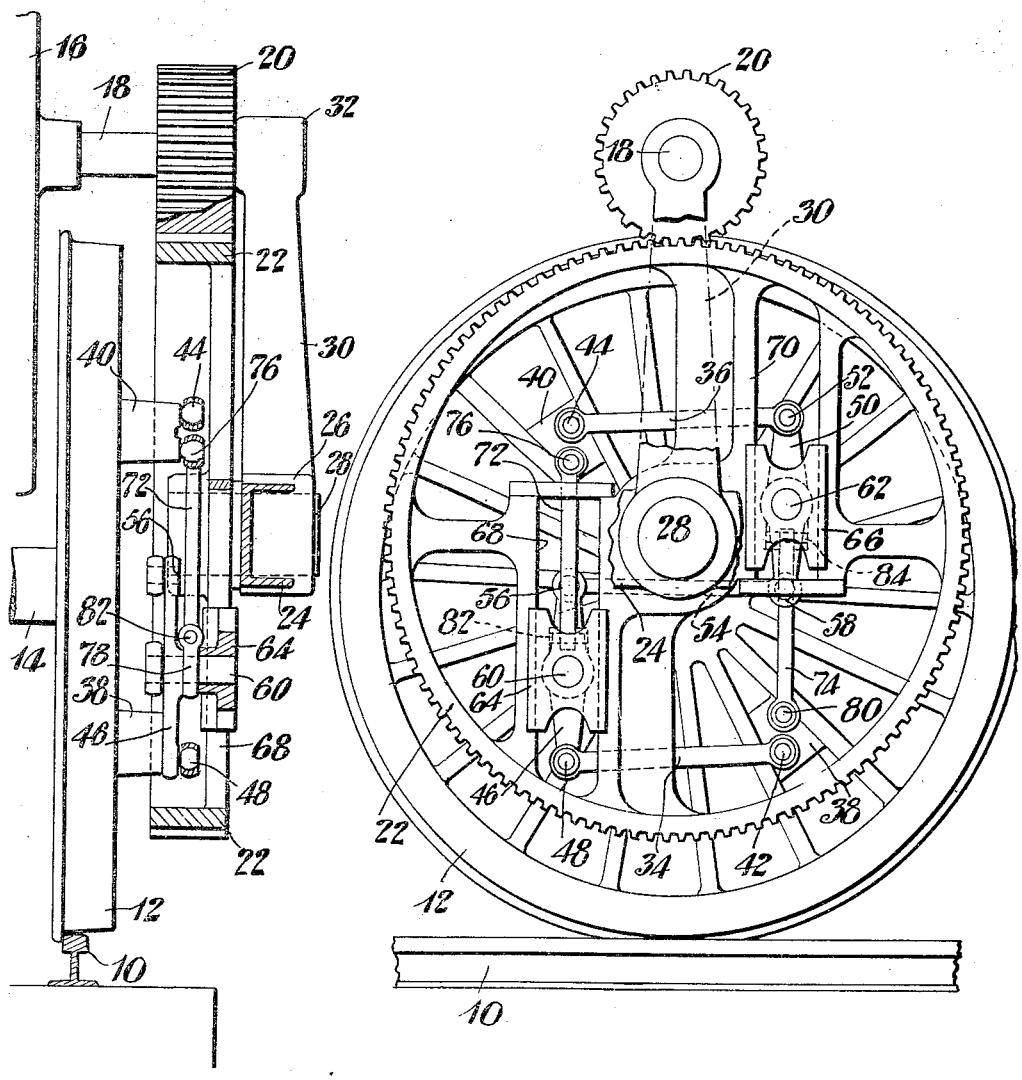
Fig. 1 is an elevation of a locomotive driver and a reduction gearing for driving the same, together with a coupling according to the present invention connecting the gear wheel of the reduction gearing and the locomotive driver.
Fig. 2 is a view taken from the left of Fig. 1, parts being broken away and parts being shown in section for purposes of illustration.

In the particular embodiment of the present invention illustrated in the drawings, 10 is a section of a railroad track supporting a driver 12 of an electric locomotive. The axle of the driver 12 appears at 14 in Fig. 2. The driver 12 and axle 14 are driven from an electric motor 16 whose shaft 18 carries pinion 20 meshing with a gear wheel 22. In the arrangement illustrated, wheel 22 is placed close to and on the outside of the driver 12 and the two rotate in parallel planes. Gear 22 is preferably supported by a channel frame 24 or other support, connected in a known manner (not shown) with the spring supported frame of the locomotive. The frame work 24 is formed with a hub 26 providing a bearing for the axle 28 of the gear 22. Preferably a supporting arm 30 is extended upwardly from the hub 26 and formed at its upper end into a bearing 32 for the shaft 18.

The gear wheel 22 is set parallel and close to the driver 12. Also as above noted, gear 22 is on the outside of the driver 12. Almost the entire space between the drivers is therefore available for the frame of the motor 16. The gear 22 being close to the wheel 12, little clearance need be provided between the locomotive and the track structures along the right of way. Moreover the gear 22 is shown as mounted so that its axis of rotation is materially above that of driver 12, thereby illustrating the present coupling operating under the condition of a large permanent eccentricity or offset between the axes of rotation of the driving and driven members.

The gear wheel 22 is connected to the driver 12 and in driving relation thereto by means of a coupling according to the present invention and includes a pair of links 34 and 36. In the arrangement illustrated, links 34 and 36 are each pivoted directly at one end to the driving wheel 12. For this purpose the driver is provided with a pair of rigid posts 38 and 40 extending outwardly at right angles to the plane of rotation of the driver 12. The rod 34 is pivoted to the outer end of the post 38 at the point 42, and the rod 36 is pivoted to the outer end of the post 40 at the point 44. In the position of the parts illustrated in Fig. 1, rods 34 and 36 are substantially horizontal, lying on the opposite sides of the axes of rotation of the driver 12 and gear 22, and the points 42 and 44 lie on opposite sides of the vertical plane through the axes of rotation of the wheels 12 and 22. It will be seen therefore that rods 34 and 36 extend in the same direction around driver 12 relative to their points of connection with the driver. Each of the other ends of rods or links 34 and 36 is connected to a pivoted lever. Rod 34 is connected to a lever 46 at the point 48 and rod 36 is connected to the lever 50 at the point 52. The connections between rods 34 and 36 and levers 46 and 50 are pivotal connections in both cases. The arrangement of rods and levers just described permits the effective length of rods 34 and 36 to be adjusted in accordance with or to accommodate change in eccentricity between the axes of rotation. The levers 46 and 50 are pivotally supported substantially at their centers and the lever 46 is pivotally connected at the end opposite pivot 48 with a central connecting rod 54, the point of connection between lever 46 and rod 54 appearing at the point 56. The end of the lever 50 opposite the pivot 52 is also connected pivotally to the rod 54, the point of connection between lever 50 and rod 54 appearing at point 58. The levers 46 and 50 are carried by the gear wheel 22 and, in the arrangement illustrated, are pivoted centrally at the points 60 and 62 respectively. The arrangement of the levers 46 and 50 and rod 54 just described holds the levers 46 and 50 from turning under the pull of the driving torque in rods 46 and 50 thereby causing rods 46 and 50 to transmit the torque and also causing the stresses in the rods to be equal.

The pivots 60 and 62 are illustrated as carried on blocks or cross-heads 64 and 66 respectively, said blocks being slidably mounted in guides or slides 68 and 70 in the gear wheel 22. The slides 68 and 70 are parallel, as clearly appears in Fig. 1 and are on the opposite sides of the axis of gear 22.

In order that the coupling according to the present invention may accommodate itself to lateral movement between the axes of the wheels 12 and gear 22 or in other words, to changes of eccentricity of the axes, it is necessary that the points of application of the driving stresses to the member carrying the levers 46 and 50 be shifted transversely to the lines of the stresses in rods 34 and 36 produced by the driving torque. The necessary shifting of the points of application of the stresses due to the driving torque may be produced by other mechanism than that illustrated, but the one illustrated includes the parallel sides if preferred as introducing no error and as being kinematically correct in case of either long continued or temporary changes in eccentricity. In other words pivots 60 and 62 or points of application of the stresses should be in certain given positions relative to the center of the member on which they are carried for a given eccentricity between the axes of members 12 and 22. If this condition is satisfied, a change in eccentricity causes no angular variation of the posts. In the arrangement illustrated the slides 68 and 70 are arranged on parallel chords of gear 22 and the parts of the coupling are held in proper relative position under the varying conditions encountered in use by suitably positioning cross-heads 64 and 66 along guides 68 and 70. As illustrated, cross-heads 64 and 66 are held in and move to the desired position in slides 68 and 70 by connecting the cross-heads to the driver 12.

It is preferred to connect the points 60 and 62, at which the levers 46 and 50 are pivotally supported and thereby cross-heads 64 and 66 to the posts 38 and 40. For this purpose, links 72 and 74 are employed. Link 72 is pivoted to the post 40 at the point 76, the other end of the link 72 being pivoted to the pivot point of the lever 46 as clearly appears at 78 in Fig. 2. Also the link 74 is pivoted to the post 38 at the point 80, the other end of link 74 being pivoted to the pivot point 62 of the lever 50 in a manner not shown but similar to the way in which link 72 is coupled to the pivot of lever 46.

The pivot 44 is close to pivot 76 and the two can be placed on the same pin, if desired. Similarly pivots 42 and 80 may have a pin or axis in common. The links 72 and 74 and rod 54 act together to cause the positive increasing and decreasing of the effective length of rods 34 and 36 as required by changes in eccentricity by setting the levers 46 and 50 at the right angle to the rods for a given position of the gear 22 and driver 12 and of the cross-heads 64 and 66. In other words, the coupling according to the present invention includes means for positively adjusting the effective length of the rods 34 and 36 to agree with the varying distances between the pivots at points 42 and 44 on the one hand and points 60 and 62 on the other.

The links 72 and 74 each contain a joint whose axis is at right angles to the joints at the ends of the links. One of the intermediate joints in the links is illustrated in link 72 at the point 82 in Fig. 2. The other intermediate joint in the links appears in link 74 at the point 84 in Fig. 1. The intermediate joints 82 and 84 together with the pivot joints such as 78 at the points 60 and 62, are the substantial equivalent of ball and socket joints between the links 72 and 74 at the points where they pivot on the axes 60 and 62. It will be noted moreover that the joints at the points 44, 48 and 76 are illustrated as being in the form of ball and socket joints, all the joints in the present coupling being preferably either ball and socket joints or their equivalent. This is to permit the coupling and its parts to accommodate movements of the gear 22 throwing it out of parallel position with respect to driver 12 and produced by rolling, pitching and turning of the spring supported frame with respect to the axle 14 of the driver.

Tossing movements, even when of considerable extent, of the frame of the locomotive with respect to the axle 14, meaning thereby those movements in which the spring supported frame moves vertically without any rolling or rocking from one side to the other or any turning with respect to the axle 14 about the vertical axis, are accommodated accurately by the coupling mechanism or device above described, due to its inherent character. In the operation of the said device, the driving torque is transmitted from the gear wheel 22 through the slides 68 and 70 and blocks 64 and 66 to the pivoted levers 46 and 50. From the levers 46 and 50 the torque is transmitted to the posts 38 and 40 on the driving wheel by means of rods 34 and 36. The central coupling rod 54 between the inner ends of levers 46 and 50 insures that the stresses in the rods 34 and 36 shall be always equal. The links 72 and 74 insure that the pivots 60 and 62 shall always take the necessary positions in slides 68 and 70 so that the lateral displacement of the axis of the gear wheel 22 with respect to the axis of driver 12 producing changes of eccentricity between the axes of rotation of the members 14 and 22 shall not cause any rotative torque or angular variation between the gear and the driver. The device according to the present invention therefore is capable not only of accommodating a fixed eccentricity between the axis of the gear wheel 22 and that of the driver 12, but is also able to accommodate itself to quick changes of eccentricity or movements from a concentric to an eccentric position, or the reverse, such as are produced by tossing of the spring supported frame on the road or by breakage of the springs.

The capacity of a coupling to accommodate itself to quick changes of eccentricity between the driving members such as gear 22 and the driven member such as wheel 12 is independent of whether or not the driving and driven members are rotating. However, experience has shown that certain mechanisms can accommodate a certain degree of eccentricity in one position and cannot do so in a position some degrees from the first. The coupling according to the present invention can accommodate itself to changes in eccentricity irrespective of the angular position of the parts. If a given coupling mechanism can accommodate itself to changes in eccentricity without producing a rotative torque between the driven and driving members, it is adapted to accommodate itself to eccentricity between the axes of rotation of the two members without producing abnormal stresses on the parts of the coupling. Furthermore, since no abnormal stresses are set up in the parts of the coupling, the coupling can accommodate itself to quick lateral movements of the axis of the driving or driven member with respect to that of the other member as well as to permanent eccentricity of the two axes produced by their mounting. As between the capacity to accommodate quick changes in eccentricity and capacity to accommodate a permanent offset between the axes of the driving and driven members, the capacity to accommodate quick changes in eccentricity is considered the more important. This is for the reason that many locomotive drives adapted both for electric and other motors are arranged so that the axes of the driving gears or other driving members are concentric with the axes of the driven members such as the locomotive drivers. Moreover, even though a coupling is adapted to accommodate a permanent eccentricity between the axes of the driving and driven member, it may be nevertheless subject to high stresses producing a high rate of wear, and perhaps breakage, unless it can also accommodate itself to quick changes in eccentricity between the axes of the two members.

Figure 3:
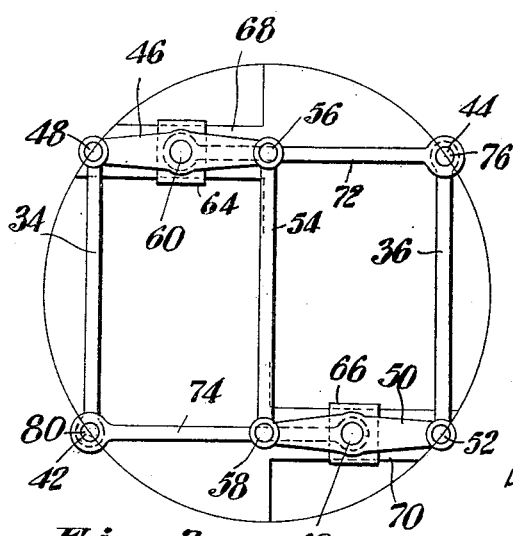
Figure 4:
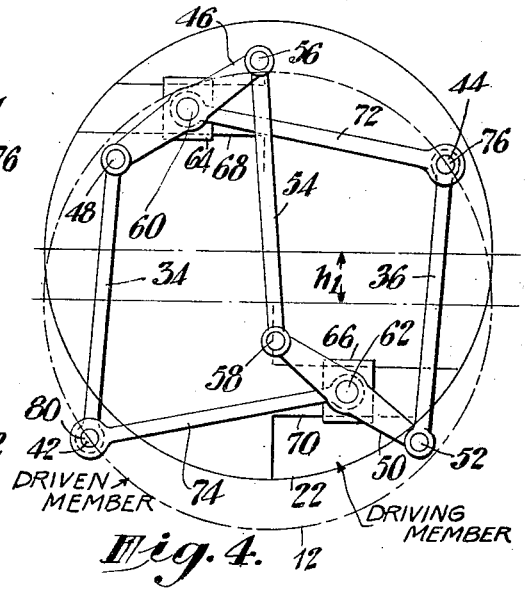

In Figs. 3 and 4 there is illustrated the action of the coupling according to the present invention in accommodating itself to a quick shift in eccentricity between the axes of gear 22 and wheel 12 when the rods 34 and 36 are in the vertical position, the slides 68 and 70 being horizontal. In Fig. 3, it is assumed that the axis of the driving member coincides with that of the driven member, the rods 34 and 36 being parallel and vertical, and the levers 46 and 50 being parallel and horizontal. If now the center of the driving member is shifted vertically upward so that there is a distance $h_1$ between the two axes, the rods, levers and links of the coupling automatically adjust themselves to the positions shown in Fig. 4 to accommodate the shift in eccentricity; and it will be seen that the distance between the point 56 and point 58 in Fig. 4 remains the same as the distance between these two points in Fig. 3, thereby demonstrating that no abnormal stress is placed upon the rod 54 when parts of the coupling shift to accommodate themselves to the new position of the driving and driven parts. Similarly, it will be seen by measurement that the pivots at the ends of the rods 34 and 36 are the same distances apart in the two figures and that the distances between the ends of the links 72 and 74 are also the same, so that no abnormal stresses are set up in any of the parts of the couplings in changing from one condition of concentricity to one of eccentricity or from a given condition of concentricity to a condition of greater eccentricity.

Figure 5:
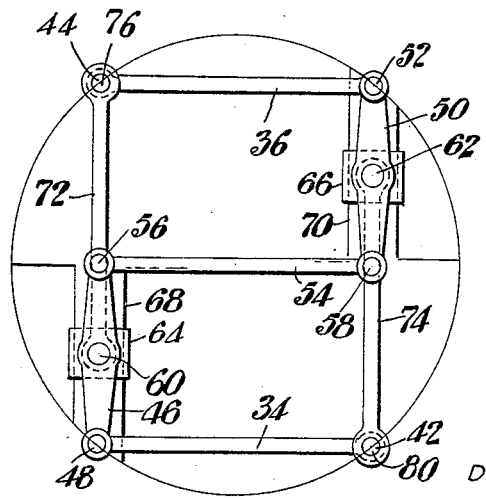
Figure 6:
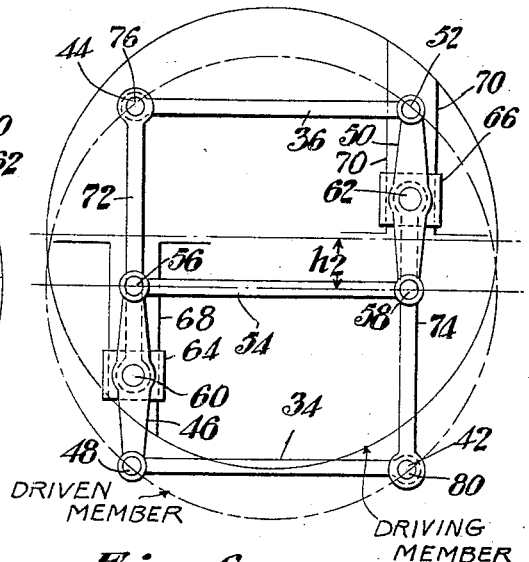

It sometimes occurs that a coupling can accommodate itself readily to a quick change in eccentricity between the axes of the driving and driven members when the movement between the axes is in a given direction with respect to the position of the parts of the coupling, but cannot accommodate itself equally well to a quick change in eccentricity when the parts are in some other position or the relative motion is in a different direction. Accordingly, Figs. 5 and 6 have been designed to illustrate the action of the coupling according to the present invention in accommodating itself to a quick change in eccentricity between the axes of the driving and driven members when the coupling has been turned through an angle of 90° from that occupied in Figs. 3 and 4. In Figs. 5 and 6 the rods 34 and 36 are horizontal as in Fig. 1. In Fig. 5, as in Fig. 3, the axis of the driving members is assumed to be concentric with that of the driven member. In Fig. 6, the axis of the driving member has been shifted vertically a distance $h_2$ with respect to the axis of the driven member. By measuring the distances between the pivot points at the ends of the various rods, links and levers in the coupling, it will be noted that these distances in Fig. 6 are in each case the same as in Fig. 5, thereby demonstrating that the shift in eccentricity from the position shown in Fig. 5 to that shown in Fig. 6 produces no abnormal stresses on the parts and can produce no rotative torque between the driving and driven members.

In a similar way by laying out the positions of the parts first when concentric and then when eccentric, and at various angular positions intermediate those of Figs. 3 and 5 it can be demonstrated that in no case does the lateral shift between the axes of the driving and driven members cause an abnormal stress or rotative torque between the members when the two are connected by applicant's coupling. Two members coupled in driving relation by the present coupling device therefore are free to rotate uniformly without any rotative torque between the two caused by the action of the coupling when the axes shift from one relative position to another.

It is an important feature of the device according to the present invention that it permits or accommodates itself to end play between the driving and driven axles. It has been found that, in a device of the type illustrated, end play is best accommodated by setting the rods 34 and 36 substantially parallel to each other, but at a slight angle to the central rod 54. It results from this arrangement of the rods that the straight line distance between the pivots 48 and 52 is somewhat greater than the distance between the pivots 42 and 44.

It will be understood that, in the above discussion of Figs. 3 to 6 it is assumed that the driving and driven members are stationary and that the axes of the two are then spread apart the distances $h_1$ and $h_2$. If under these conditions the coupling accommodates itself to the new positions of the axes without a change in the length of the ends of the parts, the coupling is adapted to accommodate not only quick or semi instantaneous shift of the axes with respect to one another when rotating, but also to accommodate a fixed eccentric mounting of the parts and accommodate an additional instantaneous shift of the axes such as would be produced by deflection of the springs of a locomotive.

It will be seen from the foregoing that the coupling according to the present invention is adapted for use not only in designs in which the driving gear is outside the locomotive drivers, but is adapted also to designs in which the driving gear is placed between the locomotive drivers and mounted on a quill surrounding the axle of a pair of drivers. Furthermore, the coupling according to the present invention is not limited to use with electric motors or in locomotives, but may be employed with any desired type of motor and in any situation in which a flexible coupling or flexible heavy duty power transmission is desired. For instance, it is well adapted for use in connection with steam turbines, gas turbines, and Diesel or other internal combustion engines, both in locomotives and in stationary practice. It is particularly useful wherever a gear wheel is to be connected to a driven shaft under conditions analogous to those existing in a locomotive.

While a specific description has been given above of a single particular embodiment of the present invention, it will be understood that the foregoing description and accompanying illustration are given by way of example only, and that the present invention is defined and limited solely by the appended claims.

I claim:

1. The combination of a rotary driving member, a rotary driven member, and a coupling intermediate said members, said coupling including a pair of rods pivotally connected directly to one of said members, levers pivotally connected to said rods and pivoting on the other of said members, means for transferring stresses from one of said levers to the other, and means for shifting the pivot points of said levers with respect to said other member with changes in eccentricity between the axes of said members.

2. The combination of a driving member and a driven member mounted for rotation about parallel axes, and a coupling intermediate said members, said coupling including stress transferring means pivotally connected with one of said members, means connected intermediate the other of said members and said stress transferring means for increasing and decreasing the effective length of said stress transferring means, and means for adjusting the position of said length changing means comprising pivotally compounded levers whereby the coupling accommodates itself to quick changes of eccentricity between the axes of said members without producing a rotative torque between said members.

3. The combination of a driving member, a driven member, said members being mounted for rotation about parallel axes, and a coupling intermediate said members, said coupling including a pair of rods pivoted to one of said members, means connecting said rods to said other member and acting also both to equalize the stresses in said rods and to increase and decrease the effective length of said rods, and means for adjusting the position of said means whereby the coupling accommodates itself to quick changes in eccentricity between said axes.

4. The combination of a driving member, a driven member, said members being mounted for rotation about parallel axes, and a coupling between said members, said coupling including a pair of rods pivoted directly to one of said members, a pair of cross-heads mounted on the other of said members to move along parallel chords of said other member on opposite sides of its axis, levers pivoted on said cross-heads and to said rods, a rod connecting said levers and arranged to equalize the stresses in said rods, and links connected to said cross-heads, and to the one of said members to which said rods are directly pivoted, said links having each an end near an end of one of said rods and acting to adjust the position of said cross-heads to cause the coupling to accommodate itself to quick changes in eccentricity between said axes.

5. The combination of a rotary driven member, a rotary driving member, and a coupling intermediate said members, said coupling including inelastic rods pivoted to one of said members, inelastic members pivoted to the other of said members and to said rods, and means for adjusting the position of said last mentioned inelastic members, said coupling being constructed and arranged to accommodate a quick lateral movement of the axis of one of said members relative to the other without causing a rotational torque between said members.

6. The combination of a rotary driving member, a rotary driven member, and a coupling between said members, said coupling including a pair of rods pivoted to one of said members, a pair of levers pivoted to the other of said members and to said rods, and means automatically adjusting the pivots of said levers to cause the coupling to accommodate a quick lateral movement of the axis of one of said members relative to the other without causing a rotational torque between said members.

7. The combination of a rotary driving member, a rotary driven member, and a coupling between said members, said coupling including a pair of rods pivoted to one of said members, a pair of levers pivoted to the other of said members and to said rods, a rod connecting said levers at points on the opposite sides of their pivots from the points of connection with said first mentioned rods, and means automatically adjusting the position of the pivots of said levers to cause the coupling to accommodate a quick lateral movement of the axis of one of said members relative to the other without causing a rotational torque between said members.

8. The combination of a rotary driving member, a rotary driven member, and a coupling intermediate said members, said coupling including a pair of rods connected to one of said members, a pair of parallel guides or slides formed on the other of said members, cross-heads mounted on said slides, levers pivotally mounted on the said cross-heads and pivotally connected to said rods, means connecting said levers to transfer stress from one of said rods to the other, and means adjusting said cross-heads in said slides to accommodate the position of the parts for changes in eccentricity between the axes of the said members.

9. The combination of a driving member, a driven member, and a coupling intermediate the said members, a pair of rods pivotally connected to one of said members, a pair of parallel slides on the other of said members, cross-heads mounted on the said slides, levers pivoted on the said cross-heads and pivoted to said rods, means connecting said levers to transfer stress from one of said rods to the other, and links connecting said cross heads to the member to which said rods are directly pivoted to adjust said cross-heads and said slides whereby the coupling may adjust itself to changes in eccentricity between said members.

10. The combination of a driving member, a driven member, and a coupling intermediate said members, said coupling including a pair of rods pivoted directly to one of said members and arranged substantially parallel, a pair of levers pivotally mounted on the other of said members and connected to said rods, a third rod connecting said levers at their ends opposite their points of connection to said rods, said third rod lying between said pair of rods and at a slight angle to them.

In testimony whereof I affix my signature.

PHILIP C. GORDON.